US006826518B1

(12) United States Patent
Ivezic et al.

(10) Patent No.: US 6,826,518 B1
(45) Date of Patent: Nov. 30, 2004

(54) METHOD FOR DISTRIBUTED AGENT-BASED NON-EXPERT SIMULATION OF MANUFACTURING PROCESS BEHAVIOR

(75) Inventors: Nenad Ivezic, Bethesda, MD (US); Thomas E. Potok, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/399,540

(22) Filed: Sep. 20, 1999

(51) Int. Cl.[7] ............................................. G06G 7/48
(52) U.S. Cl. ............................ 703/6; 703/22; 703/2; 706/10; 707/102
(58) Field of Search ..................... 703/6, 22; 706/10; 707/102

(56) References Cited

U.S. PATENT DOCUMENTS

| 5,913,051 A | | 6/1999 | Leeke |
| 6,014,637 A | * | 1/2000 | Fell et al. ....................... 705/1 |
| 6,088,689 A | * | 7/2000 | Kohn et al. .................... 706/10 |
| 6,108,662 A | * | 8/2000 | Hoskins et al. ............... 706/10 |
| 6,167,406 A | * | 12/2000 | Hoskins et al. ............. 707/102 |

FOREIGN PATENT DOCUMENTS

EP          0 840 187 A2    5/1998

OTHER PUBLICATIONS

"Modeling Supply–Chain Networks by a Multi–Agent System" F. Lin, IEEE Proceedings Systems Sciences 1998, ISBN: 0–8186–8255–8, P105–114 vol. 5, Jan. 1998.*

"Multi–Agent Simulation for Balancing of Assembly Lines", I. Praca, Proceeding IEEE, 0–7803–5704–3/99.*
"Use of Discrete Event Simulation to Validate an Agent Based Scheduling Engine", S. Biswas, Proceedings Winter Simulation Conference 2000, P1778–1782.*
"Simulation–Based Production Control in the Semiconductor Industry" M. Thiel, Proceedings Winter Simulation Conference 1998, P1029–1033.*
"Agent–based Control of Manufacturing Systems" L. Monostori, Proceedings IEEE 1999, 0–7803–5489–3/99.*
"Enterprise Modeling and Simulation Platform Integrating Manufacturing System and Supply Chain" F. Kubota, Proceedings IEEE 1999, PIV–511–515, 0–7803–5731–0/99.*
"Using Simulation to Schedule manufacturing Resources", H. Czarnecki, Proceedings of 1997 Winter Simulation Conference, ACM 1997.*
"Simulation and Production Planning for Manufacturing Cells", S. Taj, Proceedings of 1998 Winter Simulation Conference, ACM 1998.*

(List continued on next page.)

*Primary Examiner*—Kevin J. Teska
*Assistant Examiner*—Fred Ferris
(74) *Attorney, Agent, or Firm*—Akerman Senterfitt (57) ABSTRACT

A method for distributed agent based non-expert simulation of manufacturing process behavior on a single-processor computer comprises the steps of: object modeling a manufacturing technique having a plurality of processes; associating a distributed agent with each the process; and, programming each the agent to respond to discrete events corresponding to the manufacturing technique, wherein each discrete event triggers a programmed response. The method can further comprise the step of transmitting the discrete events to each agent in a message loop. In addition, the programming step comprises the step of conditioning each agent to respond to a discrete event selected from the group consisting of a clock tick message, a resources received message, and a request for output production message.

16 Claims, 11 Drawing Sheets

OTHER PUBLICATIONS

"Modeling Supply–Chain Networks by a Multi–Agent System" F. Lin, IEEE Proceedings Systems Sciences 1998, ISBN: 0–8186–8255–8, P105–114 vol. 5, Jan. 1998.*

"Multi–Agent Simulation for Balancing of Assembly Lines", I. Praca, Proceeding IEEE, 0–7803–5704–3/99.*

"Use of Discrete Event Simulation to Validate an Agent Based Scheduling Engine", S. Biswas, Proceedings Winter Simulation Conference 2000, P1778–1782.*

"Simulation–Based Production Control in the Semiconductor Industry" M. Thiel, Proceedings Winter Simulation Conference 1998, P1029–1033.*

"Agent–based Control of Manufacturing Systems" L. Monostori, Proceedings IEEE 1999, 0–7803–5489–3/99.*

"Enterprise Modeling and Simulation Platform Integrating Manufacturing System and Supply Chain" F. Kubota, Proceedings IEEE 1999, PIV–511–515, 0–7803–5731–0/99.*

Lin, G.Y., et al., "An Agent–Based Flexible Routing Manufacturing Control Simulation System," Proceedings of the 1994 Winter Simulation Conference, NY, IEEE, pp. 970–977 (Dec. 11, 1994).

Cantamessa, M., "Hierarchical and heterarchical behaviour in agent–based manufacturing systems," Computers in Industry, 33, pp. 305–316 (1997).

Ehrlich, J.N., et al., "Making Better Manufacturing Decisions with AIM," Proceedings of the 1997 Winter Simulation Conference, NY, IEEE, pp. 552–558 (Dec. 7, 1997).

Schwetman, H., et al., "The Vissim/Discrete Event Modeling Environment," Proceedings of the 1997 Winter Simulation Conference, NY, IEEE, pp. 693–697 (Dec. 7, 1997).

Karrais, A., et al., "Analyse und Optimierung komplexer Produktionssysteme mit Simulations–werkzeugen," XWF Zeitschrift fur Wirtschaftliche Fertigung und Automatisierung, de, Carl Hanser Verlag, vol. 92, nr. 10, pp. 530–533 (1997).

* cited by examiner

METHOD FOR DISTRIBUTED AGENT-BASED NON-EXPERT SIMULATION OF MANUFACTURING PROCESS BEHAVIOR

STATEMENT REGARDING FEDERALLY SPONSORED RESEARCH OR DEVELOPMENT

This invention was made with government support under contract DE-AC05-96OR22464, awarded by the United States Department of Energy to Lockheed Martin Energy Research Corporation. The United States government has certain rights in this invention.

CROSS REFERENCE TO RELATED APPLICATIONS (Not Applicable)

BACKGROUND OF THE INVENTION

1. Technical Field

This invention relates to the field of manufacturing process computer simulation and more particularly to a system and method for distributed agent-based non-expert simulation of manufacturing process behavior.

2. Description of the Related Art

Historically, the traditional approach to manufacturing process management involved "batch" production. As a consequence of Henry Ford's popularization of mass production techniques during the early twentieth century, batch production techniques have permeated the production world. In one such batch technique, the Push System, upstream assembly line operations can be scheduled according to theoretical downstream assembly line results based on a plan which may not be current. In consequence, the Push System places more parts onto the production floor than is required for production and can lead to a large volume of work-in-process, excessive inventories, significant overhead for tracking parts, large queue areas, and higher costs.

In contrast, the Pull System is a contemporary manufacturing planning system based on communication of actual real-time needs from downstream operations including, ultimately, final assembly or the equivalent. More particularly, the Pull System, a real-time production technique, places material onto the production floor based on the rate of customer demand. The key to the Pull System is to smooth and balance material flows by means of controlled inventories. The Pull System's philosophy focuses upon moving partially-assembled parts throughout the production floor before issuing new parts for a subsequent production run.

Like the Pull System, the Takt System is a real-time production technique which places material onto the production floor based on the rate of customer demand. "Takt" is a German term for rhythm. Specifically, the Takt System centers about the concept of "takt time", the allowable time to produce one product at the rate customers are demanding it. Takt time is not synonymous with cycle time, which is the normal time to complete an operation on a product. Rather, in the Takt System, a common frequency of production is assumed over the whole process.

More recently, one innovative approach has incorporated real time techniques such as the Pull System and Takt System. "Lean" manufacturing has been referred to as the most effective manufacturing system to date. Lean manufacturing has proven critical to increased productivity, inventory reduction, employee involvement and bottom line profits. Specifically, lean manufacturing refers to the Toyota® Production System® and is associated with the word "lean" because "lean" implies doing more with less: less inventory, less waste, less effort to produce more (or less personnel per process), quick changeover and setup time, one-piece flow of the supply chain, and less shop floor space needed. Mass producers who have implemented a lean manufacturing system enjoy a tremendous advantage over their competitors employing mass production manufacturing techniques because lean production is a system operating in "real time."

Lean manufacturing is, in it's most basic form, the systematic elimination of waste, using the concepts of flow and pull in a production system. The touted benefits of lean production systems include 50% lower production costs, 50% less personnel, 50% less time to field new products, higher quality, higher profitability, and higher system flexibility. Just as mass production is recognized as the production system of the 20th century, lean production is viewed as the production system of the 21st century.

Still, transition from traditional to lean manufacturing approaches is a difficult process and requires major capital investment of a manufacturing company. Understanding the impact of changing from a traditional Push System to lean manufacturing incorporating a Pull System or Takt System can be difficult. Typically, specialists having expertise in manufacturing production systems and computer simulation are required to investigate the current state, project the future advanced manufacturing "lean" state, and to predict the performance of that lean setup.

As applied to the transition from traditional to lean manufacturing, computer simulation can provide performance data including throughput, cycle time, total shipments, and cost. Computer simulation can also show bottlenecks in the process which can allow the designer to evaluate alternative solutions. Advantageously, a computer simulation tool can analyze problems having variability. In other words, a computer simulation can successfully evaluate a manufacturing process in view of manufacturing conditions changing from assembly piece to piece over time.

Nevertheless, computer simulation can be a complex and cumbersome process useful only at a considerable cost. Moreover, expert operators are required both to program and operate each computer simulation, and to interpret results. Finally, existing computer simulation techniques which can simulate a manufacturing process require substantial computer hardware upon which to operate. Thus, a need exists for a method for non-expert simulation of manufacturing process behavior on a single-processor computer.

SUMMARY OF THE INVENTION

A method and system for distributed agent-based non-expert simulation of manufacturing process behavior in accordance with the inventive arrangement satisfies the long-felt need of the prior art by providing a means to create both traditional and advanced "lean" Pull and Takt systems by a non-expert, simulate the behavior of each system, and compare and contrast each system based upon user-supplied parameters. Thus, the inventive arrangements provide a method and system for simulating manufacturing process behavior on a single-processor computer. The inventive arrangements have advantages over all methods for simulating manufacturing process behavior, and provides a novel and nonobvious system and method for providing a non-expert, computer-based simulation of manufacturing process behavior.

A method for distributed agent based non-expert simulation of manufacturing process behavior on a single-processor computer comprises the steps of: object is modeling a manufacturing technique having a plurality of processes; associating a distributed agent with each process; and, programming each agent to respond to discrete events corresponding to the manufacturing technique, wherein each discrete event triggers a programmed response. The method can further comprise the step of transmitting the discrete events to each agent in a message loop.

The programming step comprises the step of conditioning each agent to respond to a discrete event selected from the group consisting of a clock tick message, a resources received message, and a request for output production message. The agent can be programmed to respond to each message according to the chosen manufacturing technique, the behavior of which the method simulates. For instance, in the case of a Push System, the programming step can comprise the steps of: in response to the clock tick message, programming each agent to place finished output in an output stack corresponding to the associated process; in response to the resources received message, programming each agent to initiate production of output using resources contained in an input stack corresponding to the associated process; and, programming each agent to pass to an agent associated with an upstream process any output in the output stack produced in response to the discrete event.

Similarly, in the case of a Pull System, the programming step can comprise the steps of: in response to the clock tick message, programming each agent to place finished output in an output stack corresponding to the associated process; in response to the resources received message, programming each agent to inspect an input stack corresponding to the associated process, and to initiate production of output if the input stack has resources adequate to completely produce an output unit; in response to the request for output production message, programming each agent to inspect an output stack corresponding to the associated process for adequate output to satisfy the output production request, to inspect an input stack corresponding to the associated process only if the output stack lacks adequate output to satisfy the output production request, to initiate production of output if the input stack has resources adequate to completely produce output sufficient to satisfy the output request, and to post a request for output production message to an agent associated with a downstream process if the input stack lacks adequate resources to satisfy the output production request; and, programming each agent to pass to an agent associated with an upstream process any output in the output stack produced in response to the discrete event. Moreover, the programming step can further comprise the steps of: setting a minimum output level of output in an output stack corresponding to a process; and, programming each agent to produce replacement output in response to the output falling below the minimum output level.

Finally, in the case of a Takt System, the programming step can comprise the steps of: in response to the clock tick message, programming each agent to compare the clock tick message with a pre-specified takt time corresponding to the associated process; and, in response to a clock tick message correlating to the pre-specified takt time, programming each the agent to place completed output in an output stack corresponding to the associated process, to retrieve resources contained in an input stack corresponding to the associated process, to initiate production of output using resources contained in the input stack, and to pass to an agent associated with an upstream process any output in the output stack.

From the agent perspective, a method for distributed agent-based simulation of manufacturing process behavior, the simulation having a plurality of agents corresponding to individual processes forming a manufacturing technique, comprises the steps of: receiving a message from an agent; identifying in the received message a discrete event selected from the group consisting of a clock tick event, a resources received event, and a request for output production event; causing an associated process to perform an activity in response to the identified event; and, messaging an adjacent agent in response to the identified event.

The agent can respond to each message according to the chosen manufacturing technique, the behavior of which the method simulates. Specifically, in the case of a Push System, the causing step comprises the steps of: in response to the clock tick event, placing finished output in an output stack corresponding to the associated process; in response to the resources received event, initiating production of output using resources contained in an input stack corresponding to the associated process; and, passing to an agent associated with an upstream process any output in the output stack produced in response to the discrete event.

Likewise, in the case of a Pull System, the causing step comprises the steps of: in response to the clock tick event, placing finished output in an output stack corresponding to the associated process; in response to the resources received event, inspecting an input stack corresponding to the associated process, and initiating production of output if the input stack has resources adequate to completely produce an output unit; in response to the request for output production event, inspecting an output stack corresponding to the associated process for adequate output to satisfy the output production request, inspecting an input stack corresponding to the associated process only if the output stack lacks adequate output to satisfy the output production request, initiating production of output if the input stack has resources adequate to completely produce output sufficient to satisfy the output request, and posting a request for output production message to an agent associated with a downstream process if the input stack lacks adequate resources to satisfy the output production request; and, passing to an agent associated with an upstream process any output in the output stack produced in response to the discrete event. Moreover, the causing step can further comprise the steps of: identifying a minimum output level of output in an output stack corresponding to a process; and, producing replacement output in response to the output falling below the minimum output level.

Finally, in the case of a Takt System, the causing step can comprise the steps of: in response to the clock tick event, comparing the clock tick event with a pre-specified takt time corresponding to the associated process; and, in response to a clock tick event correlating to the pre-specified takt time, placing completed output in an output stack corresponding to the associated process, retrieving resources contained in an input stack corresponding to the associated process, initiating production of output using resources contained in the input stack, and passing to an agent associated with an upstream process any output in the output stack.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

Recently, the software research and development community has undertaken a new approach to building complex software systems exhibiting emergent, complex behavior—agent-based software engineering. An agent is a computer program that performs some information gathering or processing task in the background. Typically, an agent is given a very small and well-defined task. Although the theory behind agents has been around for some time, agents have become more prominent with the recent growth of the Internet. Within the agent-based approach, each software component exhibits autonomy and behaves according to a common communication protocol that allows each agent to query, request, inform, and collaborate with other agents in the system. The present invention applies distributed agent-based software engineering to the analysis and simulation of manufacturing systems.

Figure 1:
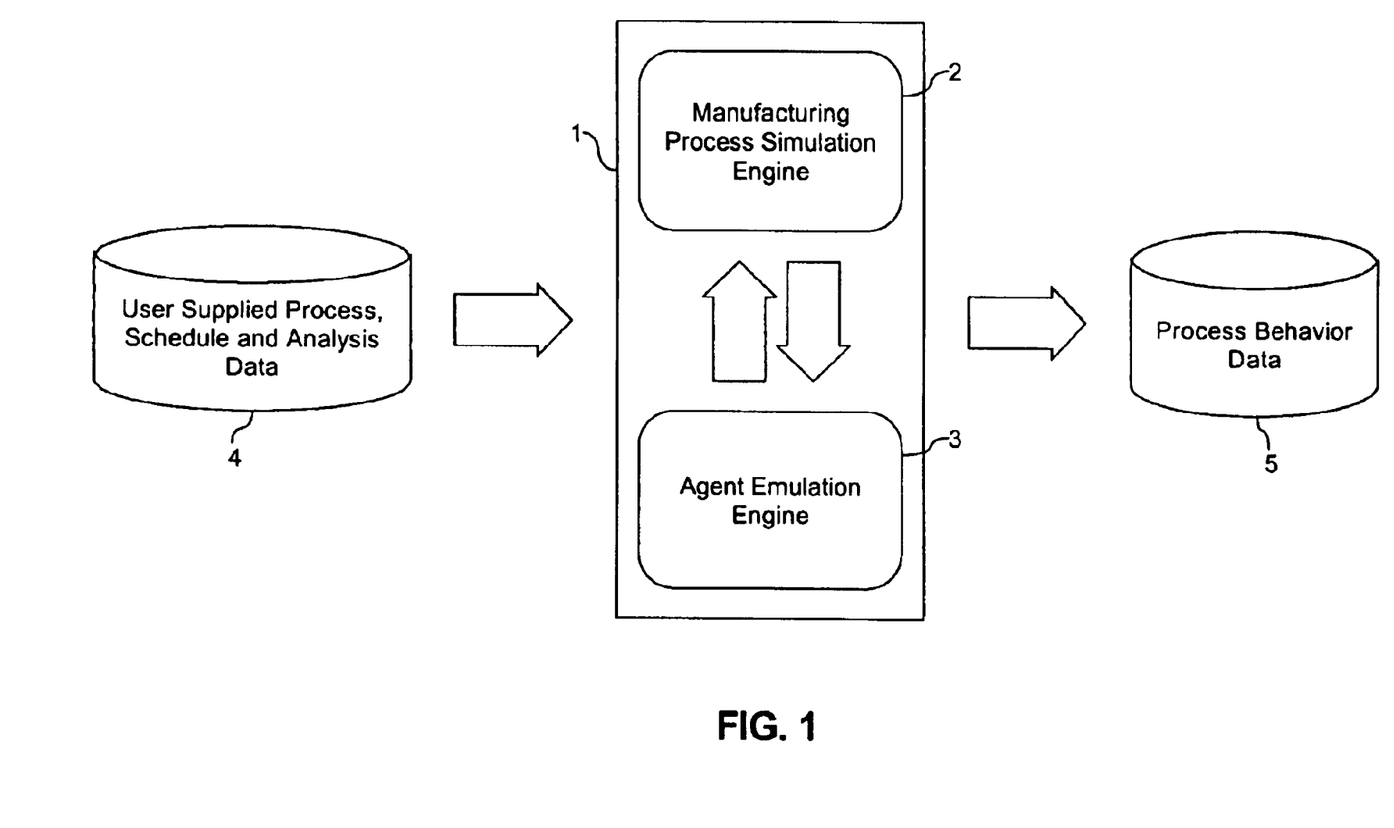
FIG. 1 is a schematic diagram of a distributed agent-based system for simulating manufacturing process behavior.

FIG. 1 is a schematic diagram of a distributed agent-based system 1 for simulating manufacturing process behavior. The present invention provides a means to emulate a general, distributed agent on a single-processor computer. Using many such agents, the system 1 can model traditional Push Systems and advanced Lean Systems, comparing each based upon user-provided input parameters. Significantly, the intended user of the system 1 is a non-expert, for example a manufacturing line manager, a process engineer, or process line foreman, each lacking experience and expertise in simulation systems development. Furthermore, each can operate the system, inexperience notwithstanding.

The present invention 1 requires certain input parameters 4 to faithfully model and simulate particular manufacturing systems. For instance, such input parameters 4 can include intended manufacturing equipment and stack connectivity in the process layout, equipment specification including activity duration, quantity of resources produced, and quantity of resources used, a stack specification, for example initial resource quantities, and the type of process management technique and a corresponding schedule. The input parameters 4 can be processed by an agent emulation engine 3 for controlling a manufacturing process simulation engine 2. From the simulation, the intended user can obtain process behavior data 5 including average and total time a resource waits in a queue, the average and total time spent by equipment processing material, the total time for a resource to enter the process and exit the process in the form of a product, and the exact times when each process starts and stops.

The inventive method can be implemented on any single-processor personal computer, for example an Intel®, AMD®, Cyrix®, Evergreen®, IBM®, Sun® or Motorola® processor based personal computer, having an operating system, for example Windows® NT®, IBM OS/2® Warp®, RedHat® Linux or Sun® Solaris®. Optimally, the single-processor personal computer is an Intel Pentium II® based personal computer operating at 300 MHz having 128 MB of RAM and 50 MB free hard disk space running the Windows NT operating system. Still, the inventive method has been successfully implemented on an Intel Pentium® based personal computer operating at 120 MHz having 64 MB of RAM and 50 MB free hard disk space running the Windows 95® operating system.

Specifically, the inventive method preferably can software coded using any number of commercially available object-oriented programming languages, for instance C++ and Java. Moreover, the inventive method can be implemented using other simulation-specific languages, for example Simula, CSIM, SimScript II.5, and Maisie. In the preferred embodiment, the inventive method is implemented using the public-domain simulation-specific language, CLIPS. Furthermore, a graphical user interface for interacting with the inventive method is written using the public domain language, Tcl/Tk.

Figure 2:
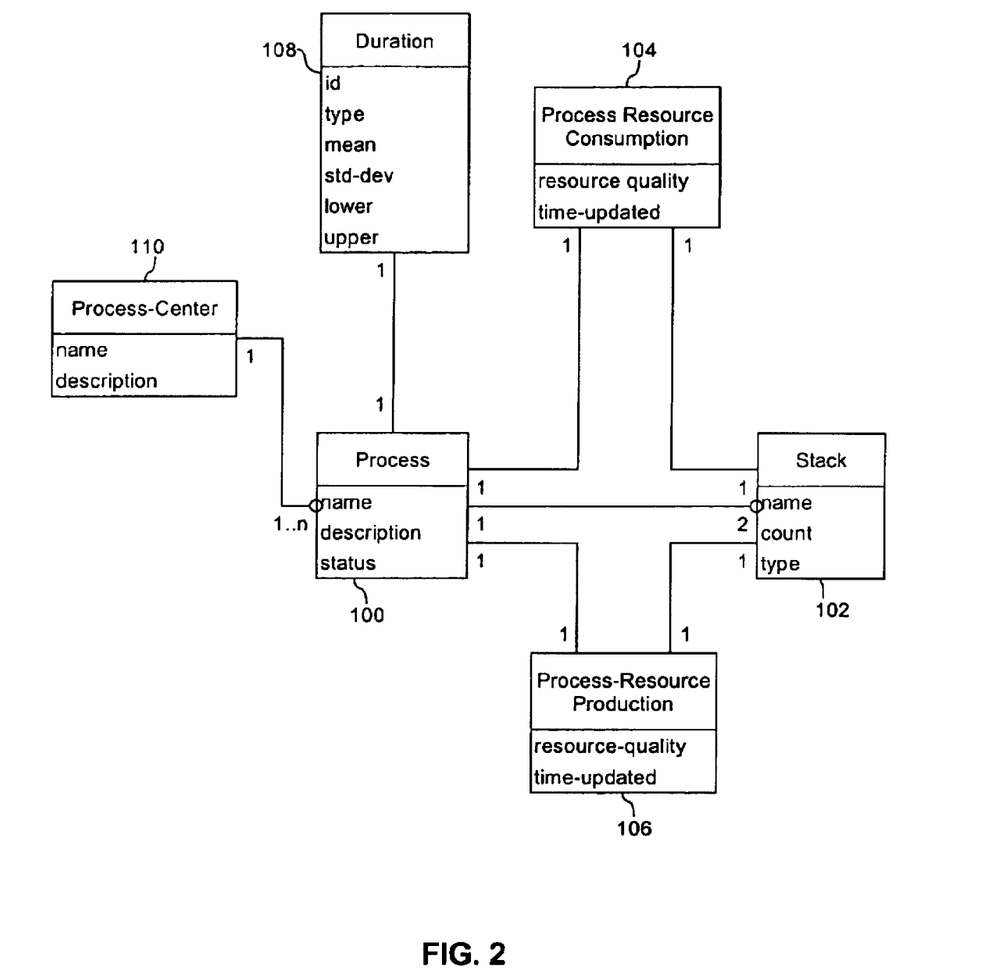
FIG. 2 is an object diagram depicting the relationship between objects in a manufacturing process simulation engine.

The manufacturing process simulation engine 2 is a variation of a discrete event simulation engine. Discrete event simulation is a very useful technique for the analysis of large models, for which even an aggregated symbolic reachability graph that exploits system symmetries is too large to be stored in a computer's main memory. Discrete event simulation has no hard complexity limits in the sense that, for incrementally larger systems, the simulation merely consumes additional CPU time. Event driven simulation technique activities usually are modeled by considering "start service" and "end service" events occurring at particular simulated times. These basic events form the event list—a set of all the events scheduled to occur considering the current simulation state. The first scheduled event to occur forces the current state to change and the advancement of the simulation clock at the occurrence time of the event. The management of a state change usually involves scheduling of new events and/or descheduling of other already scheduled events in the event list.

FIG. 2 is an object diagram depicting the relationship between objects in the manufacturing process simulation engine 2. In the preferred embodiment, a process-center object 110 manages all process objects 100, the aggregation of which form the simulated manufacturing process. Significantly, the process object 100 models a workstation in an assembly line. Hence, the process object 100 includes a reference to two stack objects 102 for receiving and delivering works-in-process. Specifically, each process object 100 has an input stack for receiving resources from a downstream process object 100, and an output stack for depositing output, formed from received resources. Notably, the output contained in the output stack of one process object 100, to an upstream process object 100, appears as resources for receipt in an input stack of the upstream process object 100.

Each instance of a process object 100 further has a reference to an instance of a duration object 108. The duration object 108 includes data members for storing the identification of the process object, the type of activity associated with the process object 100, the mean time elapsed for the activity, the lower and upper bounds to the time elapsed for the activity, as well as a standard-deviation component, Also, each process object 100, as well as the process object's 100 corresponding input stack, each has a reference to a common instance of a process-resource consumption object 104. The process-resource consumption object 104 contains the quantity of resources consumed during the activity performed by the process object 100. In addition, the process-resource consumption object 104 contains a time stamp of the most recent update. Similarly, each process object 100, as well as the process object's 100 corresponding output stack, each has a reference to a common instance of a process-resource production object 106. The process-resource production object 106 contains the quantity of resources produced by the process object 100. Likewise, the process-resource production object 106 contains a time stamp of the most recent update.

Figure 3:
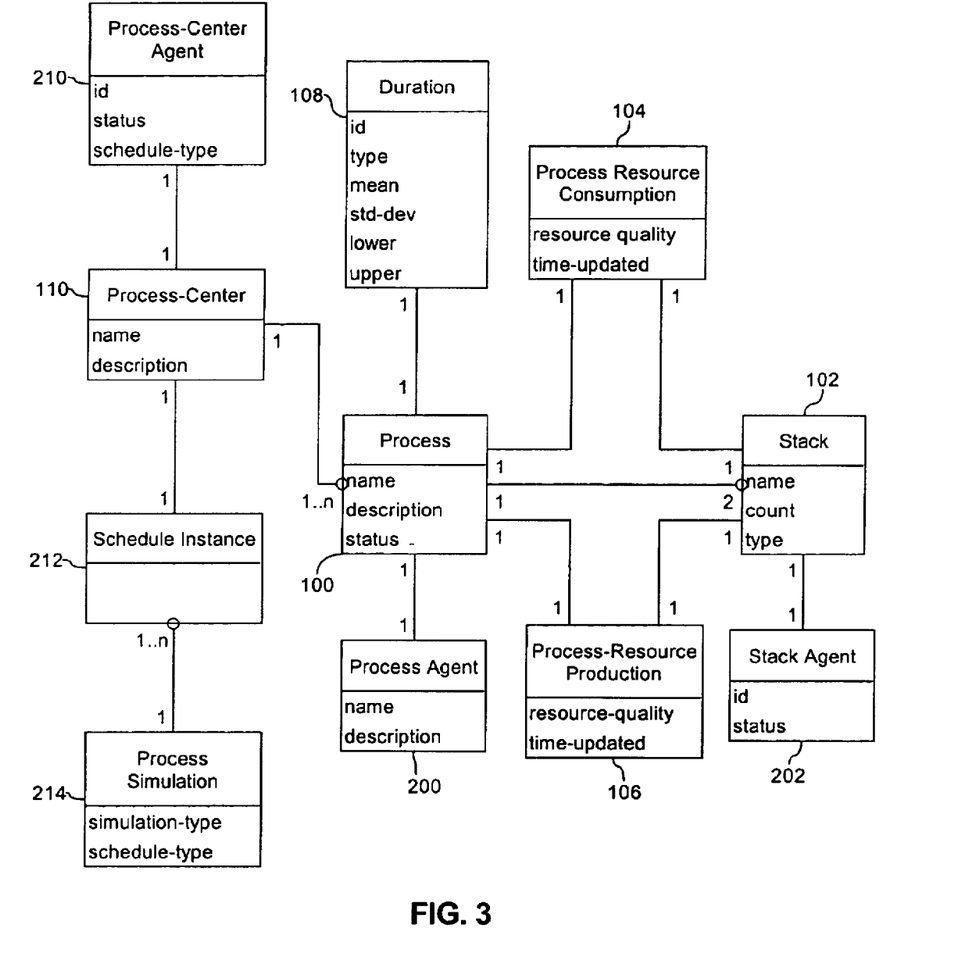
FIG. 3 is an object diagram depicting the relationship between objects in an agent emulation environment interacting with the manufacturing process simulation engine shown in FIG. 2.

FIG. 3 is an object diagram depicting the relationship between objects in the agent emulation engine 3 interacting with objects of the manufacturing process simulation engine 2 as shown in FIG. 2. In the preferred embodiment, distributed process agent objects 200 manage each process object 100 according to messages received by each process agent object 200. Each process agent object 200 can respond to received messages in a predetermined fashion. Thus, each process agent object 200 agent need only maintain an awareness of objects related to the corresponding process object 100. In addition, each instance of a stack object 102 can respond to messages received by an instance of a stack agent object 202. More particularly, a stack agent object 202 can communicate with a process agent object 200 on behalf of an associated stack object 102. Each process agent object 200 can be managed by a process center agent object 210 associated with process center object 110. As a result, a process center agent object 210 can manage the entire manufacturing process under simulation by appropriately messaging each process agent object 200 controlling a process object 100. More particularly, a process center agent object 210 can direct a particular process agent object 200 to initiate a production sequence. Similarly, the process center agent object 210 can mediate communication between an upstream process agent object 200 and a downstream process agent object 200. Specifically, the process center agent object can pass resources contained in an output stack of a downstream process agent object 200 to the input stack of an upstream process agent object 200.

Finally, an instance of the process-center object 110 can be incorporated directly into a schedule-instance object 212. Consequently, the process-center object 110 can simulate a manufacturing process according to an instance of the schedule-instance object 212. Ultimately, each instance of the schedule instance object 212 is managed by a process-simulation object 214 containing the intended manufacturing process simulation. The process-simulation object 214 further can include a simulation-type member and a schedule-type member.

Figure 4:
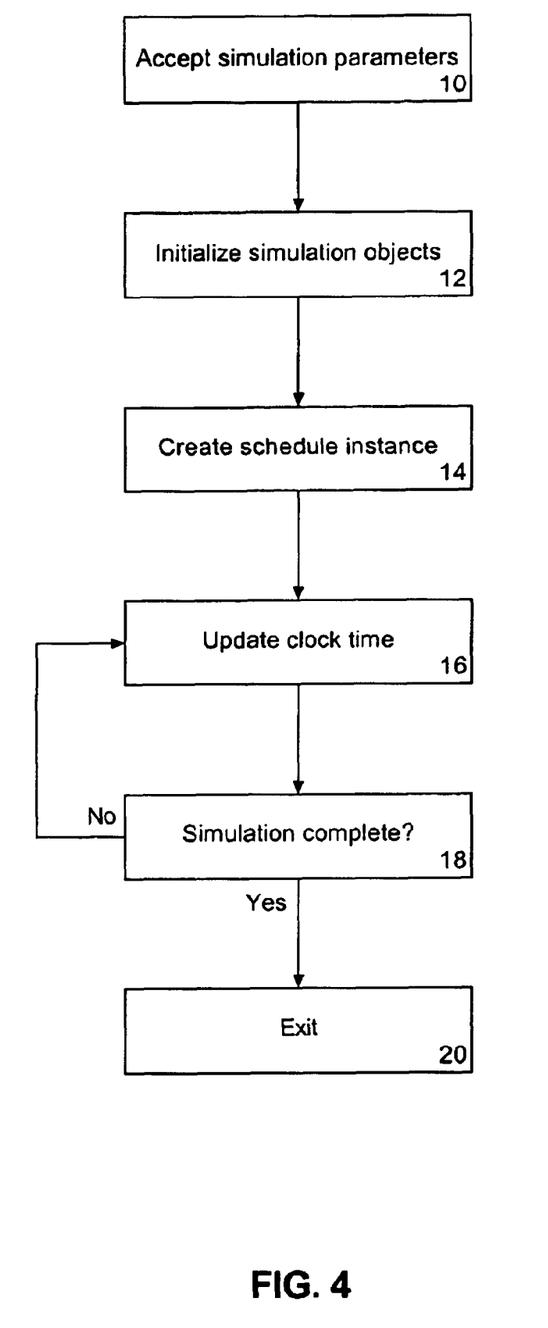
FIG. 4 is a flow chart illustrating a discrete-event control structure for a process for distributed agent-based simulation of a manufacturing process.

FIG. 4 is a flow chart illustrating an object driven discrete-event control structure for a method for distributed agent-based simulation of a manufacturing process. In the present invention, the system 1 in step 10 can accept input parameters 4 provided by the user, the input parameters 4 defining the nature and scope of the simulation. Subsequently, in step 12, the system 10 can create and initialize simulation objects defined by the agent simulation engine 3 and the manufacturing process simulation engine 2. In step 14, a schedule-instance object 212 can be instantiated, the schedule-instance object 212 having a predetermined production schedule. In particular, the schedule-instance object 212 holds instructions to place at least one order for at least one product on at least one occasion defined by the system 1 clock.

Subsequently, in step 16, the clock can update. During each clock update, the agent emulation engine 3 is notified of a new clock time. Accordingly, each process agent object 200 controlled by the process-center object 110 can respond to the clock time event appropriately. More particularly, at each clock time, each process agent object 200 can determine in what, if any, actions the process agent object 200 must engage. In this way, the agent emulation engine 3 can accurately model the participants in the manufacturing environment operating according to the chosen manufacturing technique. In decision step 18, after all instances of a process agent object 200 have had an opportunity to respond to the clock time event, the simulation loop can repeat until the simulation is complete. At completion, the simulation can terminate in step 20.

Figure 5:
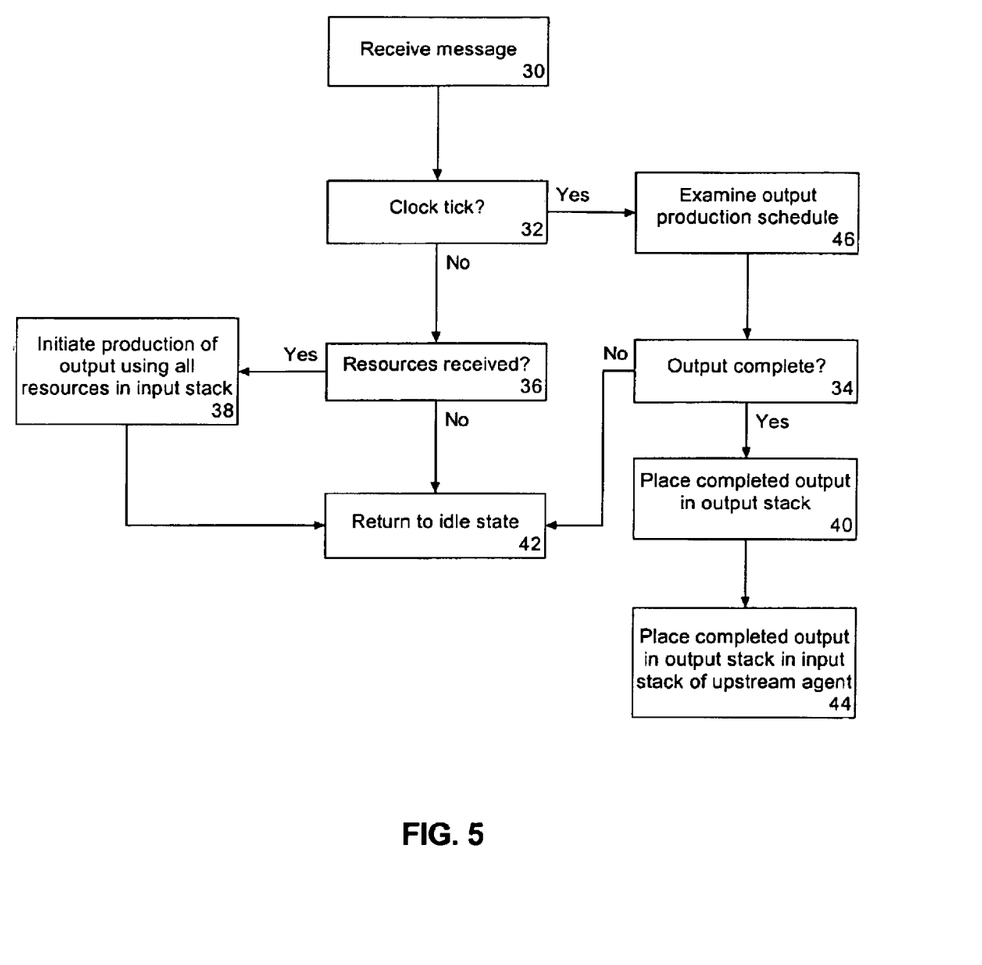
FIG. 5 is a flow chart illustrating a process for distributed agent-based simulation of a Push System manufacturing process FIGS. 6A-6E, taken together, are a flow chart illustrating a process for distributed agent-based simulation of a Pull System behavior.

FIG. 5 is a flow chart illustrating the event driven response of a process agent object 200 during a simulation of a Push System manufacturing process. As applied to a Push System, the system 1 can simulate process behavior by messaging instances of process agents objects 200, each instance of a process agent object 200 controlling a portion of the manufacturing process. In step 30, the process agent object 200 can receive a message either from another instance of a process agent object 200 or from a process-center agent object 210 controlling all instances of a process agent object 200. In the preferred embodiment, when simulating a Push System, the process agent object 200 responds only to a clock tick event or a resources received event. If, in decision step 32, the message is a clock tick event, the process agent object 200 in step 46 can interrogate the output production schedule of its corresponding process object 100 to determine if any work-in-process is complete. If in step 34 any output has been completed, in step 40, all completed output can be placed in output stack. Subsequently, in step 44, all output in output stack can be passed to an adjacent upstream process agent object 200 for placement in the input stack of an associated adjacent upstream process object 100.

In contrast, if in decision step 36, the process agent object 200 detects a receipt of resources produced by an adjacent downstream process object 100, in step 38, the process agent object 200 can initiate production of output using all received resources placed in the input stack. Significantly, the process agent object 200 initiates production regardless of the requirements of the adjacent upstream process object 100. Subsequently, the process agent object 200 can return to an idle state in step 42, while waiting for a new event.

Figure 6A:
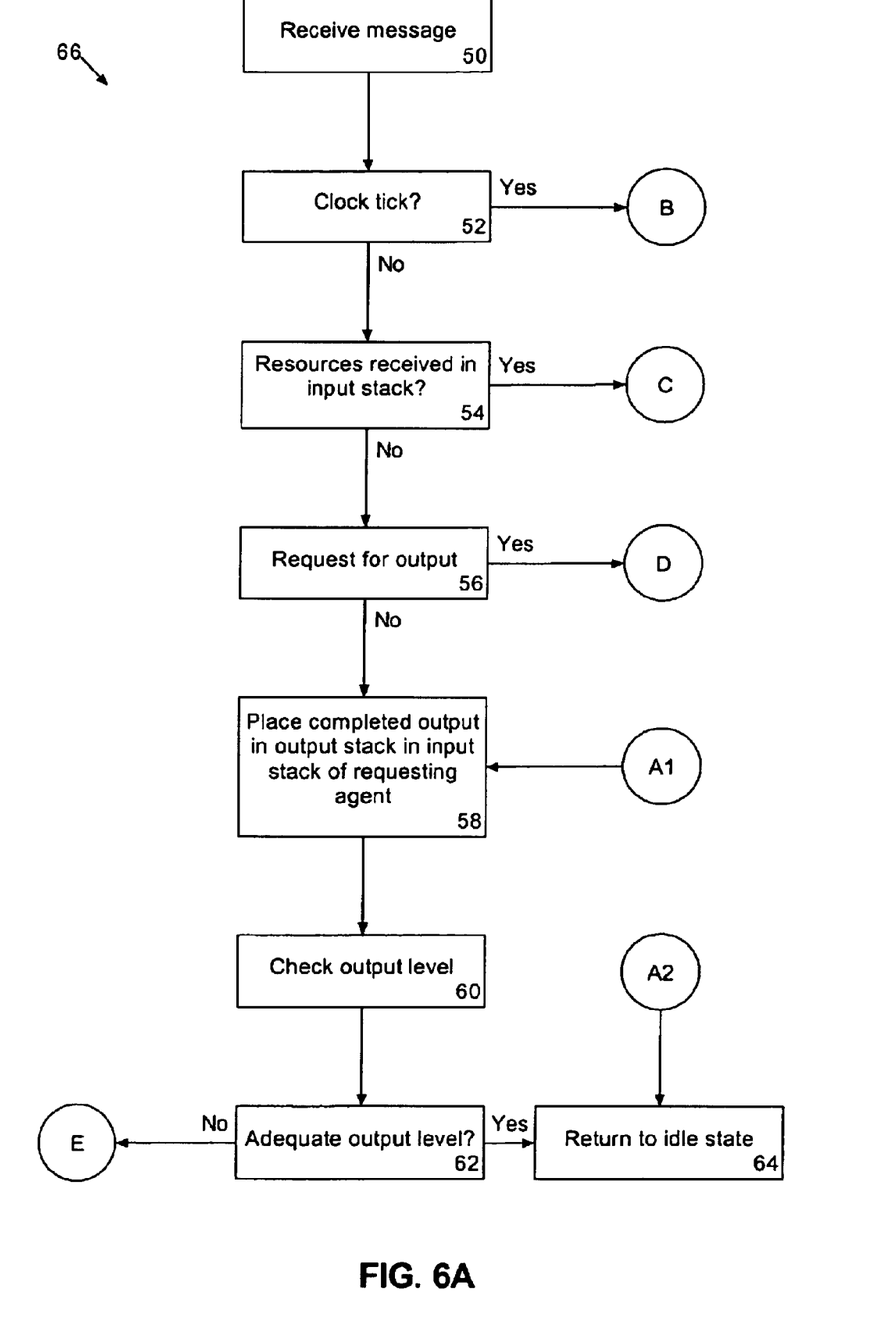

FIGS. 6A–6E, taken together, is a flow chart illustrating the event driven response of a process agent object 200 during a simulation of a Pull System manufacturing process. As applied to a Pull System, the system 1 can simulate process behavior by messaging instances of process agents objects 200, each controlling a portion of the manufacturing process. FIG. 6A shows a message loop 66 for a process agent object 200. In step 50, the process agent object 200 can receive a message either from another instance of a process agent object 200 or from a process-center agent object 210 controlling all instances of a process agent object 200. In the preferred embodiment, when simulating a Pull System, the process agent object 200 responds only to a clock tick event, a resources received event, or a request for output production event.

Figure 6B:
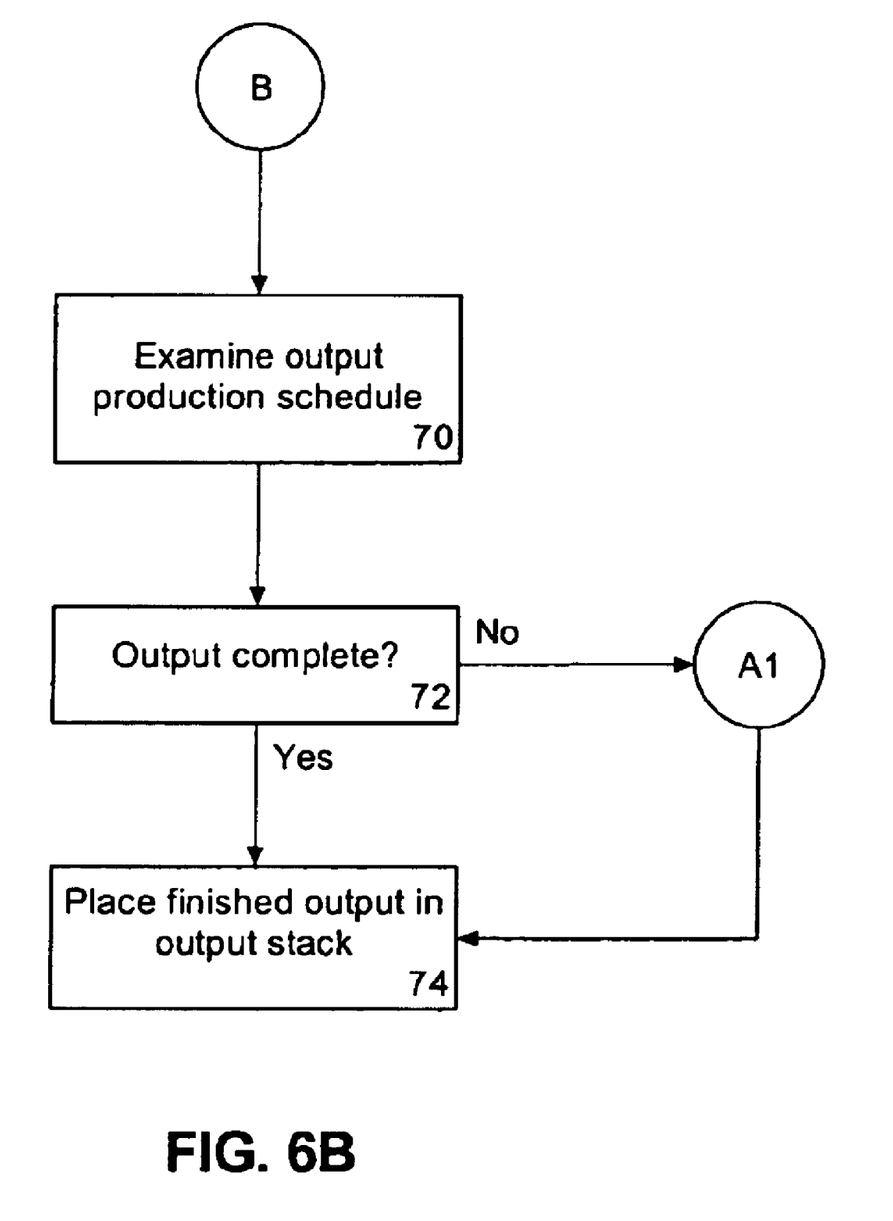

If, in decision step 52, the message is a clock tick event, the process agent object 200 can process the clock tick message through jump circle B. FIG. 6B illustrates the method for process agent object 200 to respond to a clock tick message in a Pull System simulation. Leading from jump circle B, in step 70, the process agent object 200 can query the output production schedule to determine what production orders remain to be fulfilled. In step 72, the process agent object 200 can interrogate its associated process object 100 to determine if any work-in-process is complete. In step 74, all completed output can be passed to an adjacent upstream process agent object 200 for placement in the input stack of an associated adjacent upstream process object 100 as an inputted resource. Subsequently, the process agent object 200 can return through the jump circle A1 to the message loop 66, as shown in FIG. 6A.

Figure 6C:
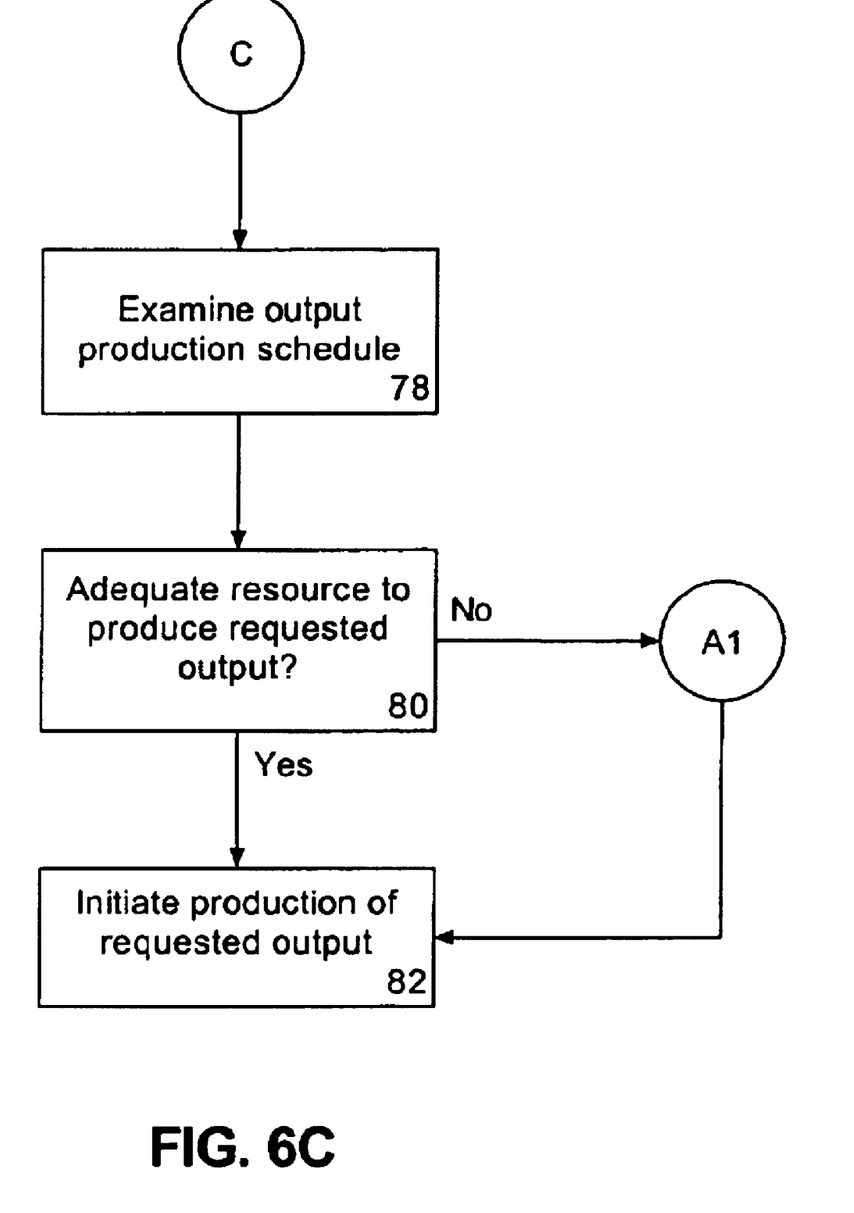

If, in decision step 54, the message is a resources received event, the process agent object 200 can process the resources received message through jump circle C. FIG. 6C illustrates the method for process agent object 200 to respond to a resources received message in a Pull System simulation. Leading from jump circle C, in step 78, the process agent object 200 can query the output production schedule to determine what production orders remain to be fulfilled. In step 80, the process agent object 200 can inspect the input stack to determine if enough resources have been received to produce an output product. If adequate resources have been received, in step 82, the process agent object 200 can initiate production in the associated process object 100. Subsequently, the process agent object 200 can return through jump circle A1 to the message loop 66, as shown in FIG. 6A.

Figure 6D:
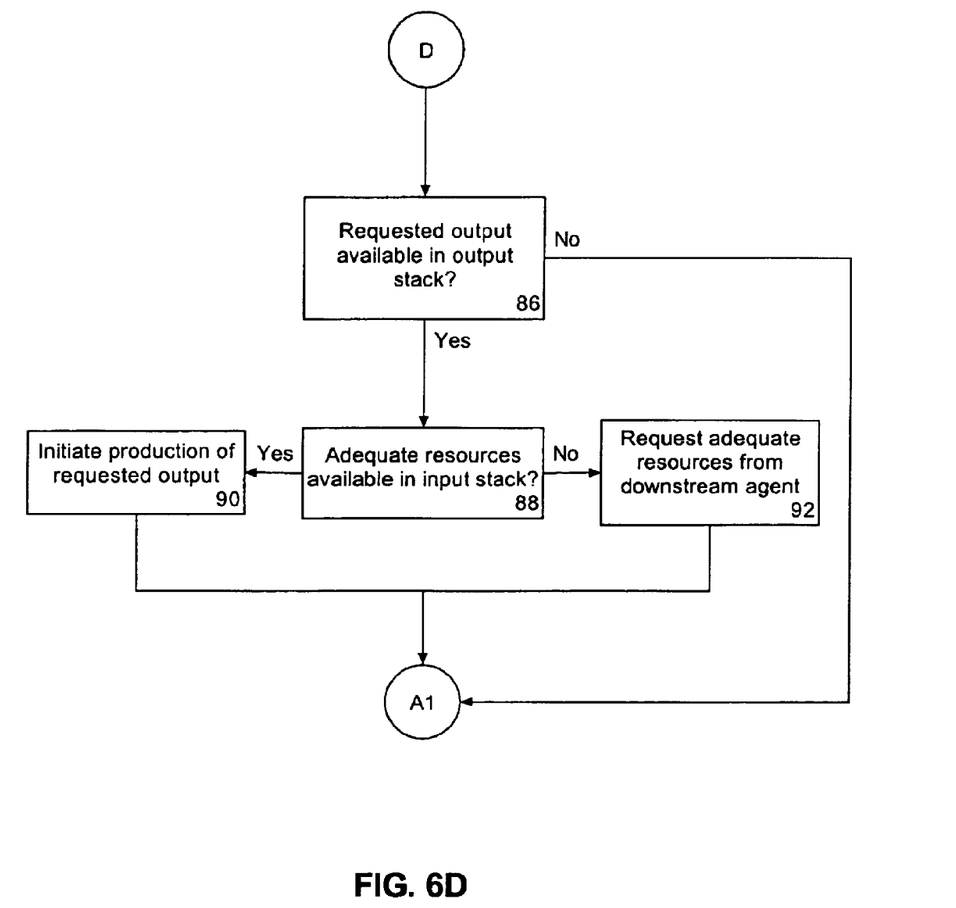

If, in decision step 56, the message is a request for output production event, the process agent object 200 can process the request for output production through jump circle D. FIG. 6D illustrates the method for process agent object 200 to respond to a request for output production message in a Pull System simulation. Leading from jump circle D, in decision step 86, the process agent object 200 can inspect the output stack to determine if the requested output has already been processed by the associated process object 100. If adequate output exists in the output stack, the process object agent 200 merely can pass the completed output to the adjacent upstream process object 100 through its corresponding process agent object 200.

If, however, the output in the output stack is not adequate to fulfill the output request, in decision step 88, the process agent object 200 can inspect the input stack to determine if enough resources have been received to produce the requested output. If adequate resources have been received, in step 90, the process agent object 200 can initiate production in the associated process object 100. Conversely, if adequate resources have not been received, in step 92 the process agent object 200 can message the adjacent downstream process agent object 200, requesting adequate resources to produce the requested output. Subsequently, the process agent object 200 can return through jump circle A1 to the message loop 66, as shown in FIG. 6A.

Returning to FIG. 6A, having appropriately responded to the message received in step 50, the process agent object 200, in step 58, can place any completed output in the output stack of the associated process object 100. Before completing the message loop 66 cycle and returning to an idle state in step 64, the process agent can inspect the output stack of the associated process object 100 to ensure an adequate output level. Specifically, in a Pull System, it is desirable to ensure that each process object 100 always maintain a particular inventory of output in the output stack. The actual desired output level can be predetermined by the user in the input parameters 4.

Figure 6E:
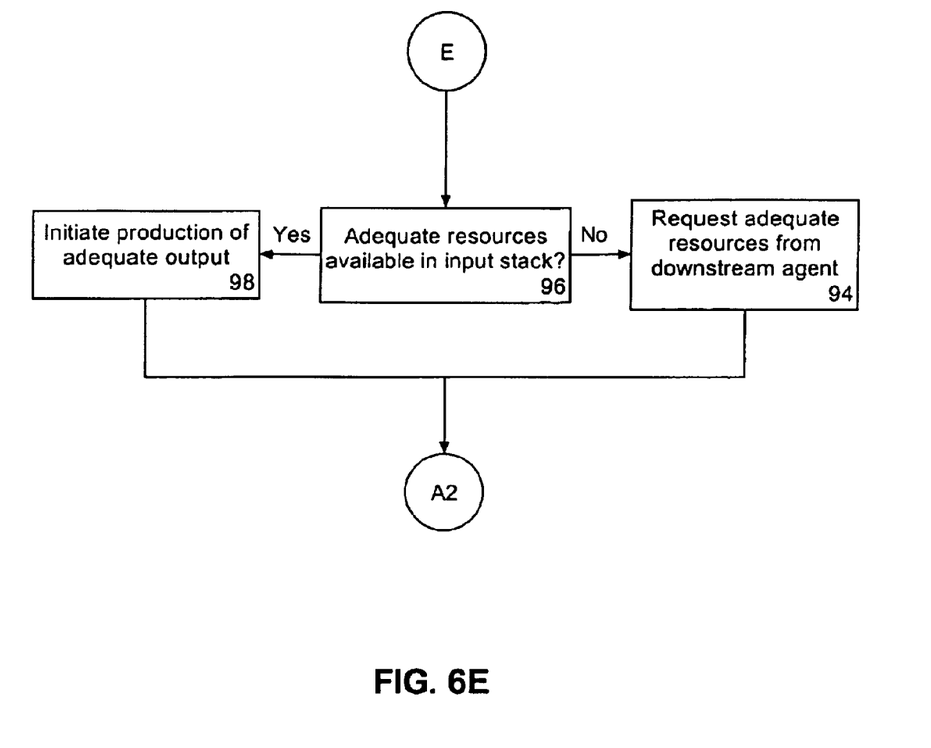

Thus, in decision step 62, if inadequate output inventory exists in the output stack, the process agent object 200 can initiate a replenishing process through jump circle E. FIG. 6E illustrates the method for process agent object 200 to replenish output stack with an appropriate inventory level of output. Leading from jump circle E, in decision step 96, the process agent object 200 can inspect the input stack to determine if an adequate number of resources have been received to produce the required output. In step 98, if adequate resources exist in the input stack, the process agent object 200 can initiate production of the required output in the associated process object 100. Otherwise, in step 94, the process agent object 200 can request adequate resources from the adjacent downstream process agent object 200. Subsequently, the process agent object 200 can return through jump circle A2 to the message loop 66, as shown in FIG. 6A. Having completed the message loop 66 cycle, the process agent object 200 can return to an idle state in step 64, awaiting a new event.

Figure 7:
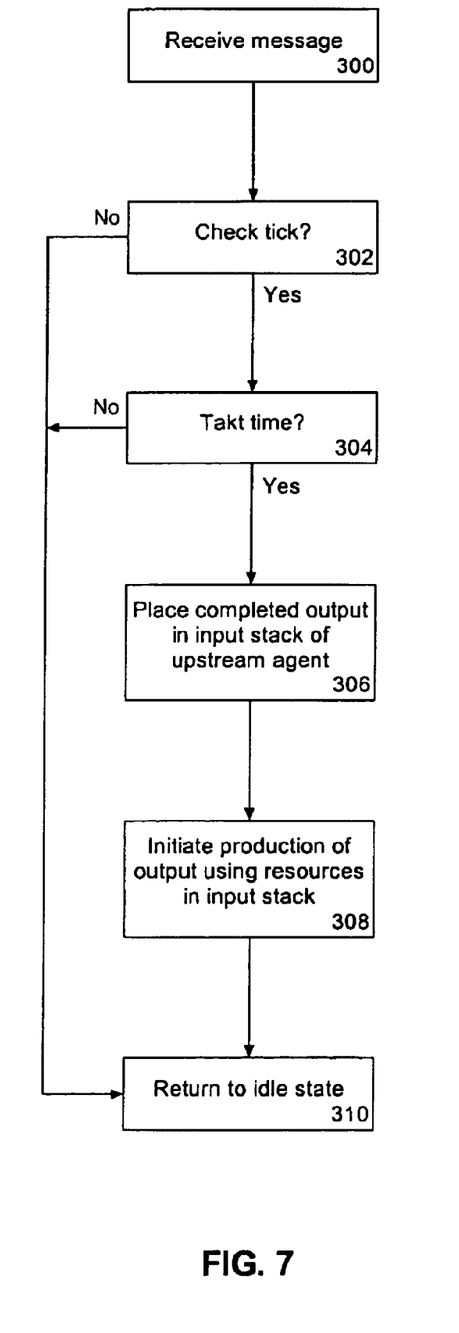
FIG. 7 is a flow chart illustrating a process for distributed agent-based simulation of a Takt System manufacturing process

FIG. 7 is a flow chart illustrating the event driven response of a process agent object 200 during a simulation of a Takt System manufacturing process. As applied to a Takt System, the system 1 can simulate process behavior by messaging instances of process agents objects 200, each instance of a process agent object 200 controlling a portion of the manufacturing process. In step 300, the process agent object 200 can receive a message either from another instance of a process agent object 200 or from a process-center agent object 210 controlling all instances of a process agent object 200. In the preferred embodiment, when simulating a Takt System, the process agent object 200 responds only to a clock tick event. If, in decision step 302, the message is a clock tick event, the process agent object 200 in decision step 304 can query the production schedule to determine if the elapsed time indicates a takt time event. Specifically, in a Takt System, process object 100 produces output in accordance with the rhythm of the simulation clock, regardless of the actions of other process objects 100. For instance, a particular process object 100 may consume three clock ticks before producing output. Thus, at the third clock tick—the takt time event—the process object 100, by and through its corresponding process agent object 200, can, in step 306, pass the completed output to an adjacent upstream process agent object 200. Similarly, the process agent object 200 corresponding to the process object 100, triggered by a takt time event, albeit not necessarily the same takt time event triggering the completion of output, can retrieve from the input stack adequate resources to initiate a new output production cycle in step 308. Presumably, the adjacent downstream process object 100 will have passed to the process object adequate resources in response to an earlier occurring or simultaneously occurring takt time event. Subsequently, the process agent object 200 can return to an idle state 310, awaiting a new event.

Hence, the system 1 satisfies the long-felt need of the prior art by providing a means to create both traditional and advanced "lean" Pull and Takt systems by a non-expert, to simulate the behavior of each system, and to compare and contrast each system based upon user-supplied parameters. Thus, the inventive arrangements provide a method and system for distributed agent based non-expert simulation of manufacturing process behavior on a single-processor computer.

What is claimed is:

1. A method for distributed agent based non-expert simulation of manufacturing process behavior on a single-processor computer comprising the steps of:

object modeling at least two different manufacturing techniques, each manufacturing technique having a plurality of processes, wherein said manufacturing techniques are selected from a plurality of different manufacturing techniques comprising a pull, a push, or a takt manufacturing technique;

associating a distributed agent with each said process of each of said two different manufacturing techniques;

programming each said agent to respond to discrete events corresponding to one of said two manufacturing techniques to which each said agent is associated, wherein each said discrete event triggers a programmed response, wherein the programming step comprises the step of conditioning each said agent to respond to a discrete event selected from the groups consisting of a clock tick message, a resources received message, and a request for output production message; and comparing each modeled manufacturing technique according to user-specified input parameters.

2. The method according to claim 1, further comprising the step of transmitting said discrete events to each said agent in a message loop.

3. The method according to claim 1, wherein the programming step further comprises the steps of:

in response to said clock tick message, programing each said agent to place finished output in an output stack corresponding to said associated process;

in response to said resources received message; programming each said agent to initiate production of output using resources contained in an input stack corresponding to said associated process; and, programming each said agent to pass to an associated agent associated with an upstream process any output in said output stack produced in response to said discrete event.

4. The method according to claim 1, wherein the programming step further comprises the steps of:

in response to said clock tick message, programming each said agent to place finished output in an output stack corresponding to said associated process;

in response to said resources received message, programming each said agent to inspect an input stack corresponding to said associated process, and to initiate production of output if said input stack has resources adequate to completely produce an output unit;

in response to said request for output production message, programming each said agent to inspect an output stack corresponding to said associated process for adequate output to satisfy said output production request, to inspect an input stack corresponding to said associated process only if said output stack lacks adequate output to satisfy said output production request, to initiate production of output if said input stack has resources adequate to completely produce output sufficient to satisfy said output request, and to post a request for output production message to an agent associated with a downstream process if said input stack lacks adequate resources to satisfy said output production request; and, programming each said agent to pass to an agent associated with an upstream process any output in said output stack produced in response to said discrete event.

5. The method according to claim 3, wherein the programming step further comprises the steps of: setting a minimum output level of output in an output stack corresponding to a process; and, programming each said agent to produce replacement output in response to said output falling below said minimum output level.

6. The method according to claim 1, wherein the programming step further comprises the steps of:

in response to said clock tick message, programming each said agent to compare said clock tick message with a pre-specified takt time corresponding to said associated process; and, in response to a clock tick message correlating to said pre-specified takt time, programming each said agent to place completed output in an output stack corresponding to said associated process, to retrieve resources contained in an input stack corresponding to said associated process, to initiate production of output using resources contained in said input stack, and to pass to an agent associated with an upstream process any output in said output stack.

7. A method for distributed agent-based simulation of manufacturing process behavior, the simulation having a plurality of agents corresponding to individual processes forming a manufacturing technique, the method comprising the steps of:

receiving a message from an agent associated with one of a plurality of different manufacturing techniques comprising a pull, a push, or a takt manufacturing technique, wherein the agent is responsive to a discrete event selected from the group consisting of a clock tick message, a resources received message, and a request for output production message;

identifying in said received message a discrete event selected from the group consisting of a clock tick event, a resources received event, and a request for output production event;

causing an associated process to perform an activity in response to said identified event; and, messaging an adjacent agent in response to said identified event.

8. The method according to claim 7, wherein said causing step comprises the steps of:

in response to said clock tick event, placing finished output in an output stack corresponding to said associated process;

in response to said resources received event, initialing production of output using resources contained in an input stack corresponding to said associated process; and, passing to an agent associated with an upstream process any output in said output stack produced in response to said discrete event.

9. The method according to claim 7, wherein said causing step comprises the steps of:

in response to said clock tick event, placing finished output in an output stack corresponding to said associated process;

in response to said resources received event, inspecting an input stack corresponding to said associated process, and initiating production of output if said input stack has resources adequate to completely produce an output unit;

in response to said request for output production event, inspecting an output stack corresponding to said associated process for adequate output to satisfy said output production request, inspecting an input stack corresponding to said associated process only if said output stack lacks adequate output to satisfy said output production request, initiating production of output if said input stack has resources adequate to completely produce output sufficient to satisfy said output request, and posting a request for output production message to an agent associated with a downstream process if said input stack lacks adequate resources to satisfy said output production request; and, passing to an agent associated with an upstream process any output in said output stack produced in response to said discrete event.

10. The method according to claim 9, wherein said causing step further comprises the steps of:

identifying a minimum output level of output in an output stack corresponding to a process; and, producing replacement output in response to said output falling below said minimum output level.

11. The method according to claim 7, wherein said causing step comprises the steps of:

response to said clock tick event, comparing said clock tick event with a pre-specified takt time corresponding to said associated process; and, in response to a clock tick event corresponding to said pre-specified takt time, placing completed output in an output stack corresponding to said associated process, retrieving resources contained in an input stack corresponding to said associated process, initiating production of output using resources contained in said input stack, and passing to an agent associated with an upstream process any output in said output stack.

12. A computer apparatus programmed with a routine set of instructions stored in a fixed medium, the computer apparatus comprising:

means for receiving a message from an agent associated with one of a plurality of different manufacturing techniques comprising a pull, a push, or a takt manufacturing technique;

means for identifying in said received message a discrete event selected from the group consisting of a clock tick event, a resources received event, and a request for output production event;

means for causing an associated process to perform an activity in response to said identified event; and, means for messaging an adjacent agent in response to said identified event.

13. The computer apparatus according to clam 12, wherein said causing means comprises:

in response to said clock tick event, means for placing finished output in an output stack corresponding to said associated process;

in response to said resources received event, means for initiating production of output using resources contained in an input stack corresponding to said associated process; and, means for passing to an agent associated with an upstream process any output in said output stack produced in response to said discrete event.

14. The computer apparatus according to claim 12, wherein said causing means comprises:

in response to said clock tick event, means for placing finished output in an output stack corresponding to said associated process;

in response to said resources received event, means for inspecting an input stack corresponding to said associated process, and initiating production of output if said input stack has resources adequate to completely produce an output unit;

in response to said request for output production event, means for inspecting an output stack corresponding to said associated process for adequate output to satisfy said output production request, inspecting an input stack corresponding to said associated process only if said output stack lacks adequate output to satisfy said output production request, initiating production of output if said input stack has resources adequate to completely produce output sufficient to satisfy said output request, and posting a request for output production message to an agent associated with a downstream process if said input stack lacks adequate resources to satisfy said output production request; and, means for passing to an agent associated with an upstream process any output in said output stack produced in response to said discrete event.

15. The computer apparatus according to claim 14, wherein said causing means further comprises:

means for identifying a minimum output level of output in an output stack corresponding to a process; and, means for producing replacement output in response to said output falling below said minimum output level.

16. The method according to claim 12, wherein said causing means comprises the steps of:

in response to said clock tick event, means for comparing said clock tick event with a pre-specified takt time corresponding to said associated process; and, in response to a clock tick event correlating to said pre-specified takt time, means for placing completed output in an output stack corresponding to said associated process, retrieving resources contained in an input stack corresponding to said associated process initiating production of output using resources contained in said input stack, and passing to an agent associated with an upstream process any output in said output stack.

* * * * *